(12) United States Patent
Efland

(10) Patent No.: US 12,067,787 B2
(45) Date of Patent: Aug. 20, 2024

(54) DETERMINING AND MAPPING LOCATION-BASED INFORMATION FOR A VEHICLE

(71) Applicant: Lyft, Inc., San Francisco, CA (US)

(72) Inventor: Kris Richard Efland, Lafayette, CA (US)

(73) Assignee: Lyft, Inc., San Francisco, CA (US)

(*) Notice: Subject to any disclaimer, the term of this patent is extended or adjusted under 35 U.S.C. 154(b) by 0 days.

(21) Appl. No.: 16/816,868

(22) Filed: Mar. 12, 2020

(65) Prior Publication Data

US 2020/0279118 A1   Sep. 3, 2020

Related U.S. Application Data

(63) Continuation of application No. 16/131,672, filed on Sep. 14, 2018, now Pat. No. 10,621,452.

(51) Int. Cl.
| | | |
|---|---|---|
| *G06V 20/58* | (2022.01) | |
| *B60W 30/06* | (2006.01) | |
| *G05D 1/00* | (2006.01) | |

(52) U.S. Cl.
CPC .......... *G06V 20/586* (2022.01); *B60W 30/06* (2013.01); *G05D 1/0088* (2013.01); *G05D 1/024* (2013.01); *G05D 1/0246* (2013.01)

(58) Field of Classification Search
CPC ......... B60W 2552/00; B60W 2552/53; B60W 2554/20; B60W 30/06; B60W 60/00253; G01C 21/32; G01C 21/3602; G05D 1/0088; G05D 1/024; G05D 1/0246; G05D 2201/0213; G06K 9/00697; G06K 9/00791; G06K 9/00812
See application file for complete search history.

(56) References Cited

U.S. PATENT DOCUMENTS

| | | | |
|---|---|---|---|
| 6,426,708 B1* | 7/2002 | Trajkovic | G08G 1/14 340/932.2 |
| 9,922,553 B2 | 3/2018 | McErlean | |
| 2015/0235383 A1* | 8/2015 | Kim | G06V 20/20 382/154 |
| 2015/0339928 A1* | 11/2015 | Ramanujam | G08G 1/202 701/23 |
| 2015/0346727 A1* | 12/2015 | Ramanujam | G05D 1/0088 701/23 |
| 2017/0123421 A1* | 5/2017 | Kentley | G06Q 10/00 |
| 2017/0124476 A1* | 5/2017 | Levinson | G06V 20/58 |
| 2017/0132934 A1* | 5/2017 | Kentley | G08G 1/202 |
| 2018/0113455 A1* | 4/2018 | Iagnemma | B60W 30/00 |

(Continued)

*Primary Examiner* — James T Boylan
(74) *Attorney, Agent, or Firm* — Sheppard Mullin Richter & Hampton LLP

(57) ABSTRACT

Systems, methods, and non-transitory computer-readable media can determine contextual information describing at least one physical structure corresponding to a location based at least in part on data captured by one or more sensors of a vehicle. A set of candidate interaction points for the at least one physical structure can be determined based at least in part on the determined contextual information describing the at least one physical structure corresponding to the location. The set of candidate interaction points can be filtered to identify one or more interaction points. An interaction point can be selected from the one or more interaction points to use for stopping the vehicle.

20 Claims, 9 Drawing Sheets

(56) References Cited

U.S. PATENT DOCUMENTS

| | | | |
|---|---|---|---|
| 2018/0202822 A1* | 7/2018 | DeLizio | G06Q 30/0645 |
| 2019/0041852 A1* | 2/2019 | Schubert | G06Q 10/0836 |
| 2019/0178656 A1* | 6/2019 | Stegall | G08G 1/202 |

* cited by examiner

DETERMINING AND MAPPING LOCATION-BASED INFORMATION FOR A VEHICLE

CROSS-REFERENCE TO RELATED APPLICATIONS

This application is a continuation of U.S. patent application Ser. No. 16/131,672, filed on Sep. 14, 2018 and entitled "DETERMINING AND MAPPING LOCATION-BASED INFORMATION FOR A VEHICLE", which is incorporated in its entirety herein by reference.

FIELD OF THE INVENTION

The present technology relates to the field of vehicles. More particularly, the present technology relates to systems, apparatus, and methods for determining and mapping information for vehicles.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine contextual information describing at least one physical structure corresponding to a location based at least in part on data captured by one or more sensors of a vehicle. A set of candidate interaction points for the at least one physical structure can be determined based at least in part on the determined contextual information describing the at least one physical structure corresponding to the location. The set of candidate interaction points can be filtered to identify one or more interaction points. An interaction point can be selected from the one or more interaction points to use for stopping the vehicle.

In an embodiment, wherein determining contextual information describing the at least one physical structure corresponding to the location comprises: determining a presence of the at least one physical structure at the location based at least in part on the data captured by the one or more sensors of the vehicle; and determining one or more features that describe the at least one physical structure based at least in part on the data captured by the one or more sensors of the vehicle.

In an embodiment, the one or more features correspond to at least one of: doorways for entering or exiting the at least one physical structure, windows associated with the at least one physical structure, parking spots within a threshold distance of the at least one physical structure, marked loading and unloading zones within a threshold distance of the at least one physical structure, and parking restrictions for a road on which the at least one physical structure is located.

In an embodiment, filtering the set of candidate interaction points to identify one or more interaction points comprises: determining a presence of one or more objects based at least in part on the data captured by the one or more sensors of the vehicle; determining that a first interaction point in the set of candidate interaction points is partially or fully obstructed by the one or more objects; and removing the first interaction point from the set of candidate interaction points.

In an embodiment, filtering the set of candidate interaction points to identify one or more interaction points comprises: determining a presence of at least one object in motion based at least in part on the data captured by the one or more sensors of the vehicle; determining that a first interaction point in the set of candidate interaction points is predicted to be obstructed by the at least one object in motion; and removing the first interaction point from the set of candidate interaction points.

In an embodiment, filtering the set of candidate interaction points to identify one or more interaction points comprises: determining that a first interaction point in the set of candidate interaction points is located within a threshold distance of a doorway for accessing the at least one physical structure; and prioritizing the first interaction point over other interaction points in the set of candidate interaction points.

In an embodiment, the interaction point is used to load one or more passengers from the at least one physical structure, unload one or more passengers at the at least one physical structure, or complete one or more deliveries to the at least one physical structure.

In an embodiment, determining the set of candidate interaction points for the at least one physical structure comprises: accessing an interaction points map for the location, wherein the interaction points map identifies a set of predetermined interaction points for the location.

In an embodiment, wherein the contextual information describing the at least one physical structure corresponding to the location is determined when the vehicle arrives at the location to load or unload one or more passengers at the at least one physical structure.

In an embodiment, wherein one or more features that describe the at least one physical structure are determined based at least in part on LiDAR data collected by the vehicle, images captured by the vehicle, optical character recognition (OCR) data determined from the captured images, motion vectors of objects represented in the captured images, historical map data, or a combination thereof.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1A:
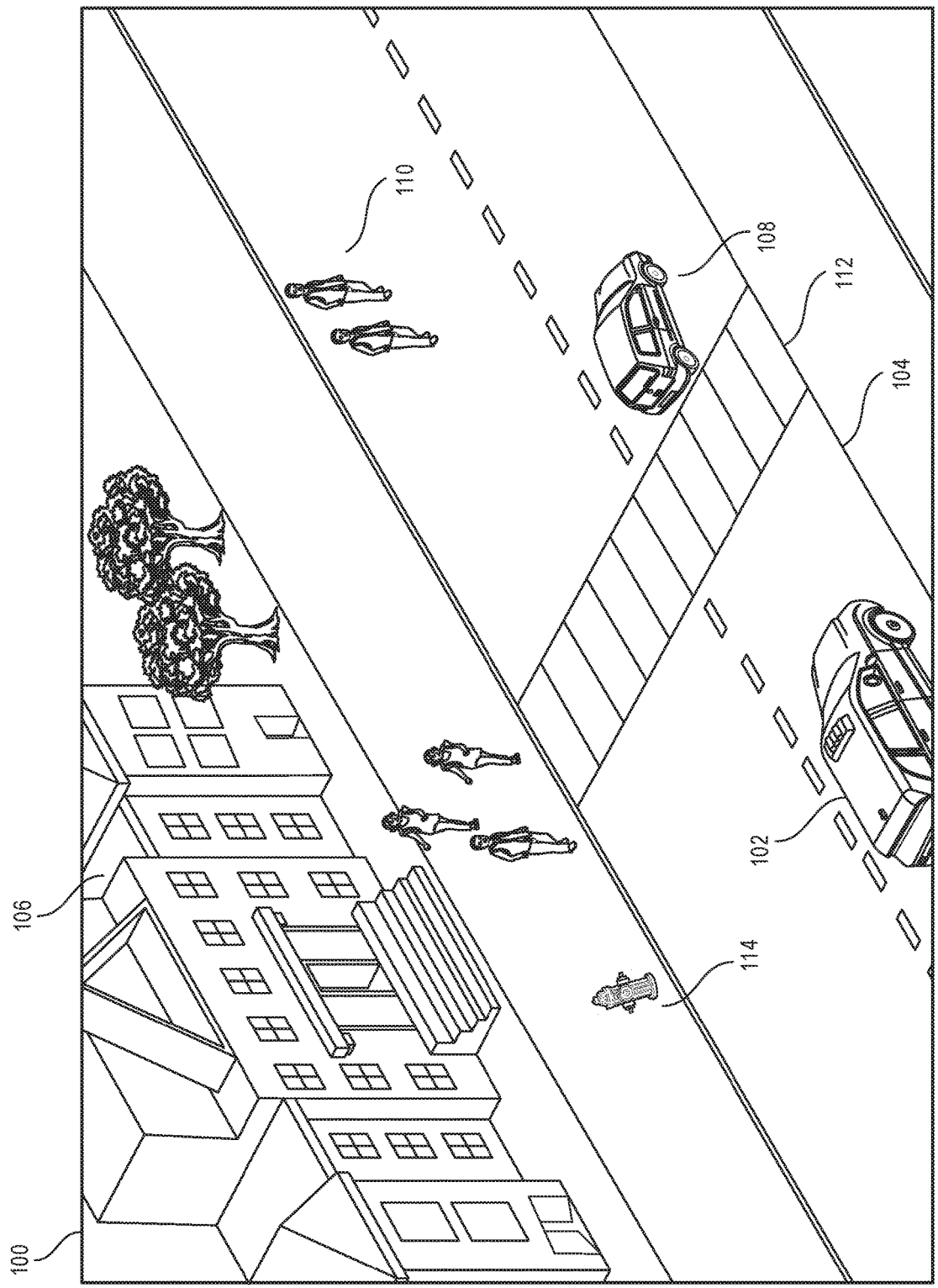
FIGS. 1A-1C illustrate various challenges that may be experienced and determined by a vehicle, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

Autonomous, semi-autonomous, or manually-driven vehicles may be used by a transportation management system to provide ride services or other types of services. A transportation management system may comprise a fleet of such vehicles. In general, vehicles used to provide transportation services typically load (or pick-up) passengers from one geographic location and unload (or drop-off) the passengers at another geographic location. Today, passengers in manually-driven or semi-autonomous transportation vehicles can typically communicate pick-up and drop-off locations to a human driver. For example, passengers can simply instruct a human driver to drop them off in front of a building or at a rear entrance of a building. However, such instructions typically cannot be provided to an autonomously-driven vehicle. For instance, a passenger may instruct an autonomous vehicle to navigate to a destination address that corresponds to a building. As one possibility, the building could span an entire city block and include multiple doors for ingress and egress. In this example, the autonomous vehicle needs to determine a drop-off location that is both convenient and safe for the passenger to exit. For example, the autonomous vehicle should determine a drop-off location that is near a main entrance to the building and also free from obstacles (e.g., vehicles, debris, pedestrians, etc.) that may create a hazardous situation for the public or the passenger. Conventional approaches pose disadvantages in addressing these and other problems.

An improved approach in accordance with the present technology overcomes the foregoing and other disadvantages associated with conventional approaches. The improved approach can allow vehicles to determine interaction points (e.g., pick-up locations, drop-off locations) for various geographic locations (e.g., points of interest, residences, businesses, etc.). In various embodiments, a vehicle can use sensor data to disambiguate between physical structures on or adjacent to roads such as buildings. The vehicle can also determine various features corresponding to those physical structures (e.g., doors, windows, parking spots near entrances, marked loading and unloading zones, parking restrictions, etc.). The disambiguated physical structures can each be identified as a building that corresponds to some location (e.g., point of interest, residence, business, etc.). After disambiguation, the vehicle can determine respective interaction points for each of the identified buildings based on a map, such as a three dimensional map of interaction points. In an embodiment, an interaction point for a given building can be some space (or region) on a road that can be used to safely park or otherwise stop a vehicle for some purpose (e.g., picking passengers up from the building, dropping passengers off at the building, making deliveries to the building, etc.). The vehicle can also evaluate real-time (or near real-time) sensor data to filter the identified interaction points. For example, the vehicle may filter interaction points based on perceived obstacles (e.g., vehicles, debris, pedestrians, etc.) that may create a hazardous situation if used to stop the vehicle. The vehicle can then identify one or more prioritized interaction points to use for the building. In various embodiments, the vehicle can determine a prioritized list of interaction points for various physical structures. More details relating to the present technology are provided below.

FIG. 1A illustrates various challenges that may be experienced by a vehicle, for example, when unloading passengers. For example, FIG. 1A illustrates one example environment 100 in which a vehicle 102 is shown navigating a road 104 to drop passengers off at a destination location 106. When navigating to the location 106, the vehicle 102 may need to determine interaction points (e.g., pick-up, drop-off locations) on the road 104 that can be used to stop the vehicle 102 and unload the passengers. As shown in FIG. 1A, identifying interaction points can be challenging since the vehicle 102 needs to find a safe place for passengers to exit while providing convenient access to the location 106. Further, there may be myriad obstacles present on the road 104 that require consideration when stopping the vehicle 102. For example, there may be other vehicles 108 and pedestrians 110 on the road 104. There may also be static (or stationary) objects that prevent the vehicle 102 from parking on the road 104. For instance, there may be a crosswalk 112 and a fire hydrant 114 that prevent the vehicle 102 from parking on some portion of the road 104.

In general, a vehicle may be equipped with one or more sensors which can be used to capture environmental information, such as information describing a given road and physical structures located on or adjacent to the road. For example, in some instances, a vehicle may be equipped with one or more sensors in a sensor suite including optical cameras, LiDAR, radar, infrared cameras, and ultrasound equipment, to name some examples. Such sensors can be used to collect information that can be used by the vehicle to disambiguate physical structures located on a given road. This information can also be used to determine additional features for disambiguated physical structures including, for example, doors (or entrances) for accessing a physical structure, windows corresponding to a physical structure, parking spots near entrances to the physical structure, marked loading and unloading zones near the physical structures, and any parking restrictions for the road. In various embodiments, disambiguated physical structures and their corresponding features can be used to determine interaction points for physical structures. In some embodiments, interaction points determined for physical structures can be used to generate or update a three-dimensional interaction point map that identifies respective interaction points for physical structures.

Figure 1B:
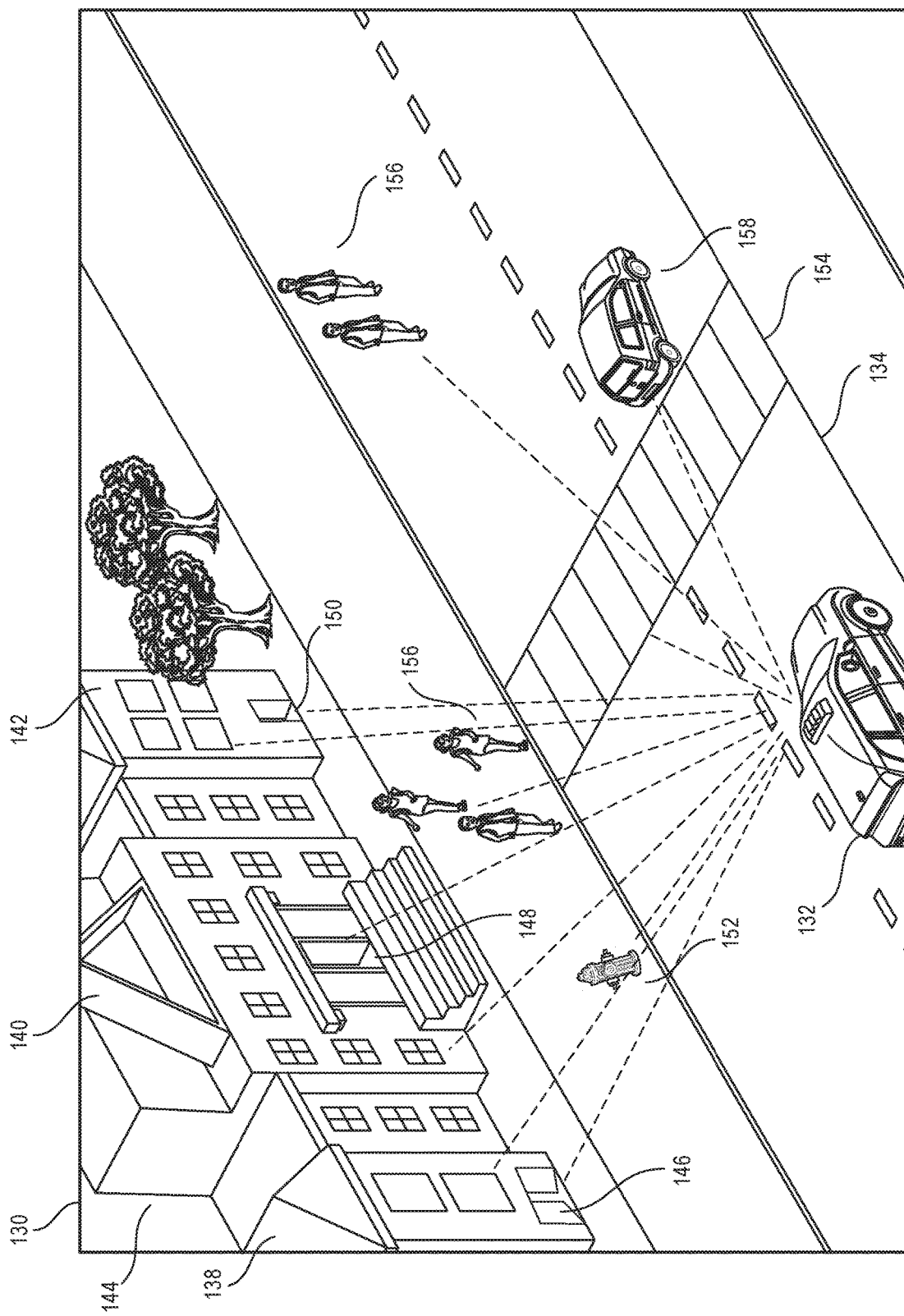
Figure 6:
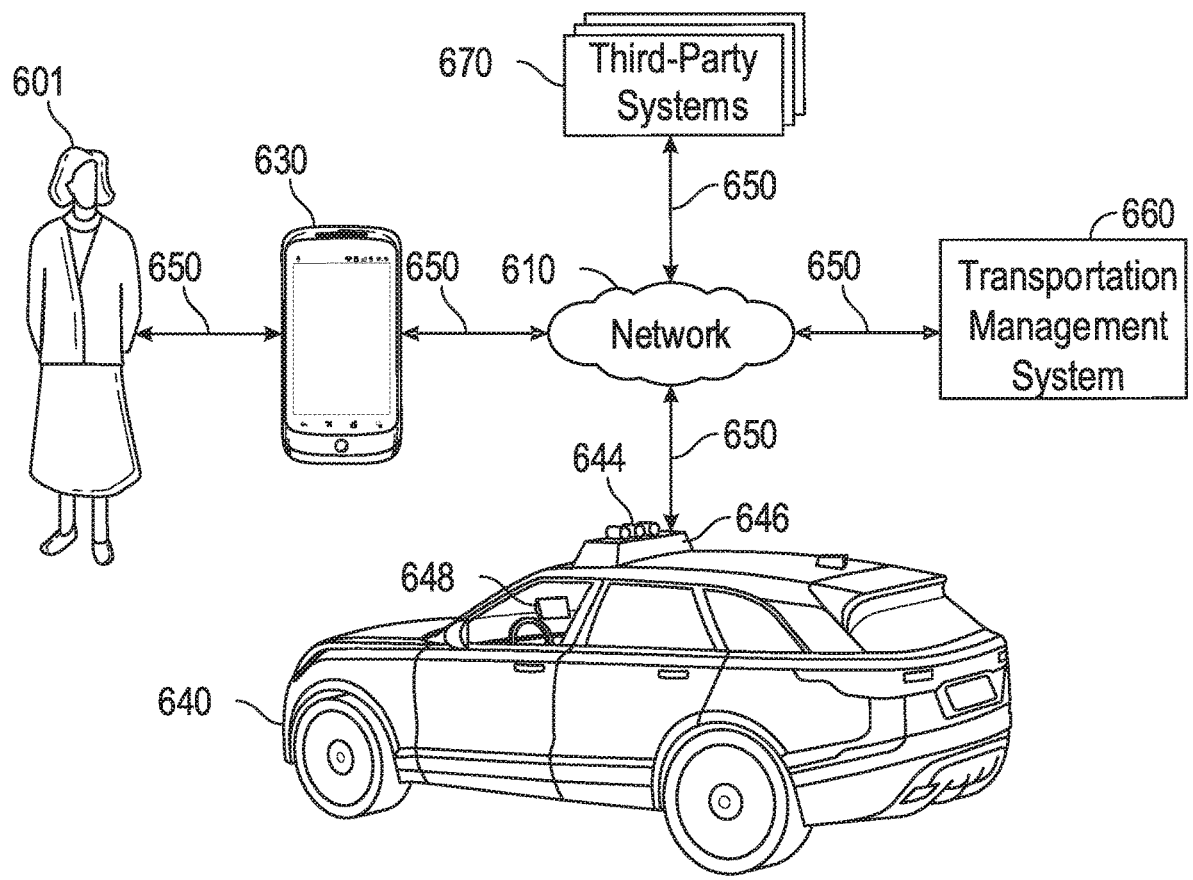
FIG. 6 illustrates an example block diagram of a transportation management environment, according to an embodiment of the present technology.

For example, FIG. 1B illustrates an example environment 130 in which a vehicle 132 is navigating a road 134. The vehicle 132 can be, for example, a vehicle 640 as shown in FIG. 6. In FIG. 1B, the vehicle 132 includes a sensor suite 136 that can be used to sense static (or stationary) objects, dynamic objects, and semi-permanent (or ephemeral) objects that are around (or within some threshold proximity of) the vehicle 132. In this example, information collected by sensors included in the sensor suite 136 can be used to determine information about the road 134 and physical structures located on the road 134. For instance, sensors in the sensor suite 136 can be used to disambiguate a first building 138, a second building 140, and a third building 142 that exist in a single physical structure 144. The vehicle 132 can also determine features for disambiguated physical structures. For example, the vehicle 132 can determine a door 146 for accessing the first building 138, a door 148 for accessing the second building 140, and a door 150 for accessing the third building 142. The vehicle 132 can also determine the presence of a fire hydrant 152 in front of the single physical structure 144, a crosswalk 154 that allows pedestrians to cross the road 134, pedestrians 156, other vehicles 158, and any other objects that are present. In addition to identifying objects, the sensors in the sensor suite 136 can also be used to monitor the identified objects. For example, once an object is identified, the sensors can be used to trace (or track) a path (or trajectory) of the object over time. Information collected by the sensors in the sensor suite 136 can be used to determine other features for physical structures on the road 134. In some instances, rather than having a sensor suite, a vehicle may be equipped with a computing device that includes a number of integrated sensors. In such instances, sensors in the computing device can collect information that can be used by the vehicle to understand and navigate a given environment. In various embodiments, information collected by the integrated sensors can similarly be used to determine physical structures and corresponding features on a given road. For example, a mobile phone placed inside of the vehicle 132 may include integrated sensors (e.g., a global positioning system (GPS), optical camera, compass, gyroscope(s), accelerometer(s), and inertial measurement unit(s)) which can be used to capture information and determine information describing physical structures.

Figure 1C:
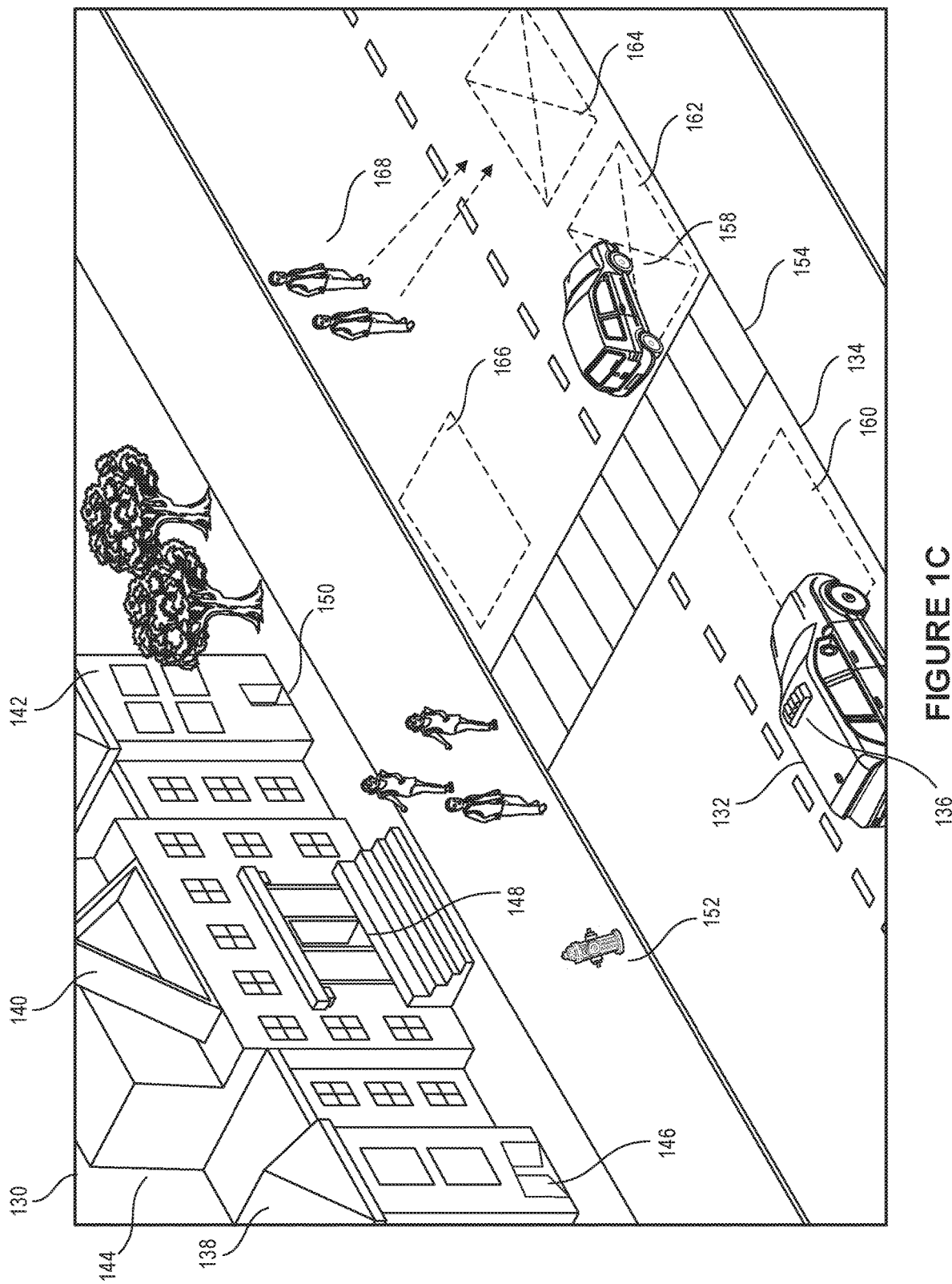

In various embodiments, real-time (or near real-time) sensor data can be used to determine and prioritize interaction points for locations. FIG. 1C illustrates example interaction points determined for the first building 138, the second building 140, and the third building 142. For example, in FIG. 1C, the vehicle 132 has identified a first interaction point 160, a second interaction point 162, a third interaction point 164, and a fourth interaction point 166. In this example, the vehicle 132 can determine that the second interaction point 162 is about to be occupied by a vehicle 158 and, therefore, is not available. The vehicle 132 can also determine the third interaction point 164 is not available because a group of pedestrians 168 are predicted to be located at the third interaction point 164 by the time the vehicle 132 arrives. Thus, the vehicle 132 can identify the first interaction point 160 and the fourth interaction point 166 as convenient and safe locations for parking the vehicle 132 when picking up and dropping off passengers at the first building 138, the second building 140, or the third building 142. More details relating to the present technology are provided below.

Figure 2:
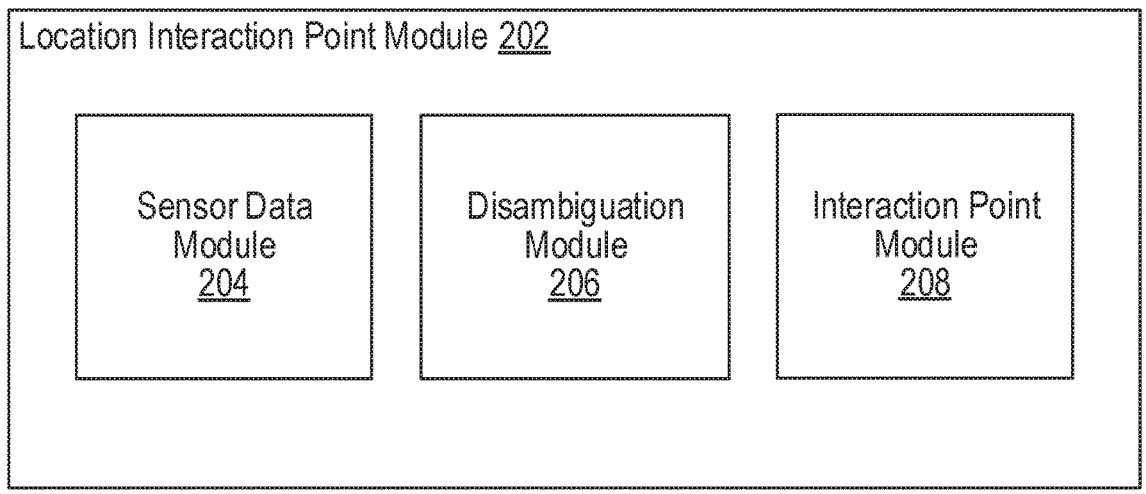
FIG. 2 illustrates an example location interaction point module, according to an embodiment of the present technology.
Figure 2:
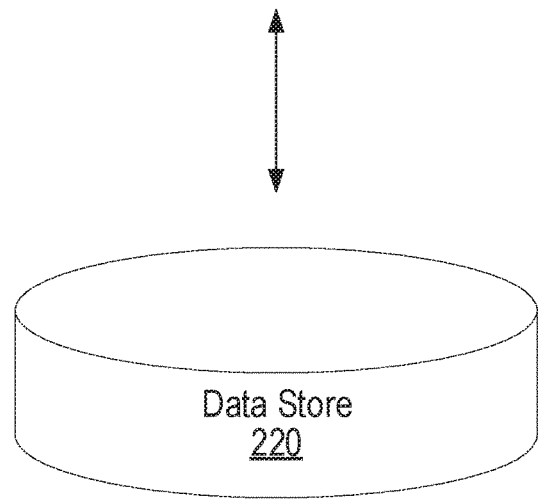

FIG. 2 illustrates an example system 200 including an example location interaction point module 202, according to an embodiment of the present technology. As shown in the example of FIG. 2, the location interaction point module 202 can include a sensor data module 204, a disambiguation module 206, and an interaction point module 208. In some instances, the example system 200 can include at least one data store 220. In some embodiments, some or all data stored in the data store 220 can be stored by a transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the location interaction point module 202 and its sub-modules may be performed by one or more backend computing systems, such as the transportation management system 660 of FIG. 6. In some embodiments, some or all of the functionality performed by the location interaction point module 202 and its sub-modules may be performed by one or more computing systems implemented in a vehicle, such as the vehicle 640 of FIG. 6.

The location interaction point module 202 can be configured to communicate and operate with the at least one data store 220, as shown in the example system 200. The at least one data store 220 can be configured to store and maintain various types of data. For example, the data store 220 can store information describing roads, physical structures located on roads and their related features, and historical data identifying known interaction points for various locations. In some embodiments, some or all data stored in the data store 220 can be stored by the transportation management system 660 of FIG. 6. In some embodiments, some or all data stored in the data store 220 can be stored by the vehicle 640 of FIG. 6. More details about information that can be stored in the data store 220 are provided below.

The sensor data module 204 can be configured to access sensor data corresponding to locations for which interaction points are to be determined. For example, the sensor data may include data captured by one or more sensors including optical cameras, LiDAR, radar, infrared cameras, and ultrasound equipment, to name some examples. The sensor data module 204 can obtain such sensor data, for example, from the data store 220 or directly from sensors associated with a vehicle in real-time (or near real-time). In some instances, the obtained sensor data may have been collected by a driver-operated vehicle included in a fleet of vehicles that offer ridesharing services. For example, in some embodiments, the driver-operated vehicle may include a computing device (e.g., mobile phone) that includes one or more integrated sensors (e.g., a global positioning system (GPS), compass, gyroscope(s), accelerometer(s), and inertial measurement unit(s)) that can be used to capture information describing physical structures on a given road. In some embodiments, the sensor data module 204 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NTP) servers), or GPS data, to name some examples. More details describing the types of sensor data that may be obtained by the sensor data module 204 are provided below in connection with an array of sensors 644 of FIG. 6.

The disambiguation module 206 can be configured to identify physical structures associated with various locations based on sensor data obtained by the sensor data module 204. For example, the disambiguation module 206 can disambiguate or distinguish between physical structures such as buildings on a given road. The disambiguation module 206 can also determine various features corresponding to those physical structures (e.g., doors, windows, parking spots, loading and unloading zones, parking restrictions, etc.). These features may be used to further disambiguate physical structures and also to determine and filter (e.g., prioritize, de-prioritize, disqualify) interaction points for locations. In some embodiments, each disambiguated physical structure can each be identified as a building that corresponds to some location (e.g., point of interest, residence, business, etc.). More details regarding the disambiguation module 206 will be provided below with reference to FIG. 3.

The interaction point module 208 can determine and prioritize interaction points for locations (e.g., physical structure, building, etc.). In various embodiments, the interaction point module 208 can identify potential interaction points, such as parking spaces, for a location based on generally known techniques for automatically identifying interaction points. For example, the interaction point module 208 can analyze sensor data corresponding to a location to identify parking spaces within some threshold distance of the location. These parking spaces can be used to stop or park a vehicle, for example, to load and unload passengers. In some embodiments, the interaction point module 208 can determine and prioritize interaction points for a location based on information describing physical structures and their related features as determined by the disambiguation module 206. For example, the interaction point module 208 can use the disambiguation information to identify a building associated with the location as well as a main entrance to the building. In this example, the interaction point module 208 can prioritize interaction points that are within a threshold distance of the main entrance of the building over other candidate interaction points. In some embodiments, the interaction point module 208 can determine and prioritize interaction points for locations based on real-time (or near real-time) sensor data captured at those locations. For example, a location may have many potential interaction points that can be used to stop or park a vehicle, for example, to load and unload passengers. However, some of these potential interaction points may not be usable, for example, due to obstructions or other road conditions. For example, a potential interaction point may be de-prioritized or disqualified because the interaction point is being partially or fully obstructed by one or more objects (e.g., pedestrians, vehicles, debris, etc.). The interaction point module 208 can also de-prioritize or disqualify interaction points based on predicted trajectories of objects detected on a road. That is, the interaction point module 208 can de-prioritize or disqualify an interaction point that is likely to be partially or fully obstructed in the near future (e.g., a time prior to a time of anticipated arrival at the interaction point by a vehicle that is to stop) by one or more objects in motion. For example, the interaction point module 208 can de-prioritize or disqualify an interaction point that is predicted to be obstructed by pedestrians walking toward the interaction point. In some embodiments, the interaction point module 208 can de-prioritize or disqualify an interaction point upon detecting objects within a threshold distance of a location. For example, the interaction point module 208 can de-prioritize or disqualify an interaction point that is within a threshold distance of a fire hydrant. In some embodiments, the interaction point module 208 can de-prioritize or disqualify an interaction point based on known or determined parking restrictions for roads. For example, the interaction point module 208 can de-prioritize or disqualify an interaction point that is within a restricted parking zone. In various embodiments, such parking restrictions can be determined based on detected parking signs, curb colors, or third-party map data, to name some examples. In other embodiments, such restricted parking zones can be subject to a time restriction that is inconsistent with the timing of a possible stop by a vehicle. In some embodiments, the interaction point module 208 can determine and prioritize interaction points based on an absence of a physical structure at a given location. For example, the interaction point module 208 can use disambiguation information to determine that no building is associated with a location. In such instances, the interaction point module 208 need not rely on interaction points that are within a threshold distance of a building feature (e.g., a main entrance) and can instead consider interaction points that are within a threshold distance of the location itself.

In some embodiments, the interaction point module 208 can determine and prioritize interaction points for locations based in part on a predetermined interaction points map. For example, the interaction points map can be a three-dimensional semantic map that identifies predetermined interaction points for various locations. In some embodiments, some or all of the interaction points identified by the interaction points map may be determined by one or more vehicles implementing the location interaction point module 202 of FIG. 2. In some embodiments, some or all of the interaction points identified by the interaction points map may be determined from transportation data collected by a fleet of vehicles that offer ridesharing services. In some embodiments, the interaction point module 208 can determine interaction points for a given location based solely on the interaction points map. For example, rather than determining its own interaction points for a given location, the interaction point module 208 can simply use interaction points identified by the interaction points map when loading and unloading passengers at the location. In some embodiments, the interaction point module 208 can determine interaction points for a given location in conjunction with the interaction points map. For example, the interaction point module 208 can determine its own interaction points for a given location based on real-time (or near real-time) sensor data, as described above. In this example, the interaction point module 208 can determine differences between interaction points for the location as identified by the interaction points map and interaction points determined by the interaction point module 208 based on real-time sensor data. In some embodiments, if no differences are found, the interaction point module 208 can prioritize interaction points identified by the interaction points map based on real-time (or near real-time) sensor data, as described above. In some instances, there may be differences between interaction points identified by the interaction points map and interaction points determined by the interaction point module 208. For example, one or more interaction points identified by the interaction points map may no longer be available due to ongoing construction. In another example, one or more interaction points identified by the interaction points map may no longer be available due to recently implemented parking restrictions. When differences are identified, the interaction point module 208 can de-prioritize or disqualify interaction points that are no longer usable for stopping or parking a vehicle based on real-time (or near real-time) sensor data, as described above. In various embodiments, information describing best interaction points, available interaction points, or disqualified interaction points for a given location can be shared (or broadcasted) to other vehicles, such as the vehicle 640 of FIG. 6, over one or more computer networks. In some embodiments, such information can be shared in real-time (or near real-time) once interaction points are filtered to allow other vehicles to utilize the filtered interaction points, for example, when loading and unloading passengers at the location.

In various embodiments, information describing interaction points for locations, as determined by the interaction point module 208, can be used to generate or update the three-dimensional interaction points map. For example, in some embodiments, the interaction points map can be generated and updated based on interaction points that were determined and prioritized for various locations by a fleet of vehicles implementing the location interaction point module 202 of FIG. 2. In some embodiments, the interaction points map can be generated and updated based on interaction points that were determined and prioritized for various locations by a fleet of vehicles that offer ridesharing services. In various embodiments, the interaction points map can be distributed to vehicles over one or more computer networks. In some embodiments, updates to the interaction points map can also be distributed to vehicles over one or more computer networks.

Figure 3:
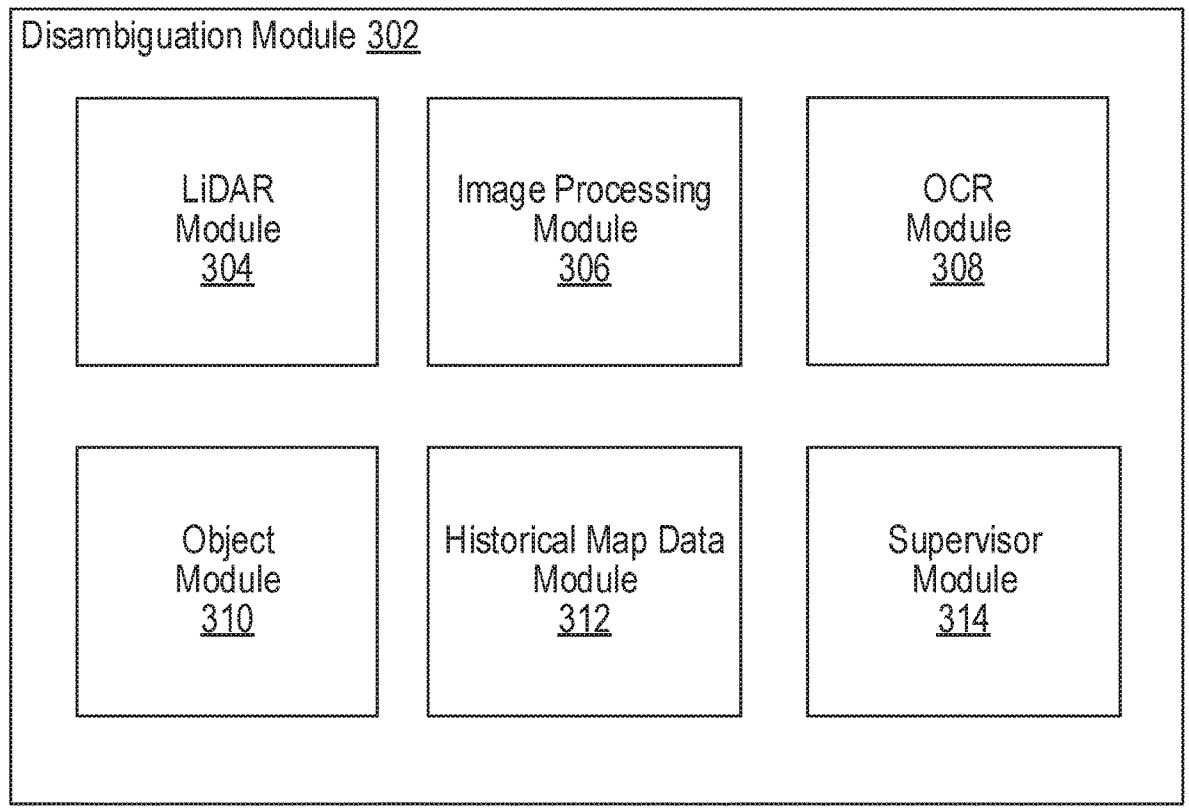
FIG. 3 illustrates an example disambiguation module, according to an embodiment of the present technology.

FIG. 3 illustrates an example disambiguation module 302, according to an embodiment of the present technology. In some embodiments, the disambiguation module 206 of FIG. 2 can be implemented with the disambiguation module 302. The disambiguation module 302 can be configured to disambiguate, distinguish, or identify physical structures on a given road based on various types of data. For example, in various embodiments, the disambiguation module 302 can disambiguate physical structures on a road based on Light Detection And Ranging (LiDAR) data collected while driving the road, segmentation data determined from images captured while driving the road, optical character recognition (OCR) data determined from the captured images, object trajectory data (e.g., pedestrian traffic patterns) determined from the captured images, known map data, or a combination thereof. As shown in the example of FIG. 3, the disambiguation module 302 can include a LiDAR module 304, an image processing module 306, an OCR module 308, an object module 310, a historical map data module 312, and a supervisor module 314.

The LiDAR module 304 can be configured to disambiguate physical structures on a road based on LiDAR data collected while driving the road. For example, the LiDAR module 304 can access one or more point clouds generated based on LiDAR data collected while driving the road. A point cloud can include a collection of data points in space that provide a three-dimensional representation of an environment and objects within the environment. In some embodiments, collected LiDAR data can be supplemented with global positioning system (GPS) information that identifies a location from which the LiDAR data was collected. In some embodiments, the LiDAR module 304 can distinguish between physical structures on a road based on their construction building materials. For example, the LiDAR module 304 can analyze LiDAR data to determine that a single physical structure is made up of a first building that is constructed using bricks and a second building that is constructed using cement. In this example, the LiDAR module 304 can measure gross changes in light reflectivity across a linear axis that is perpendicular to a detected ground plane. The LiDAR module 304 can then determine construction building materials of physical structures based on light reflectivity values. For example, the LiDAR module 304 can be configured to associate light reflectivity values with construction building materials such as bricks, cement, stucco, glass, mirrored glass, and glass and metal, to name some examples. In some embodiments, the LiDAR module 304 can distinguish between physical structures based on an average density of foliage as represented in one or more point clouds. For example, a pair of adjacent physical structures may be distinguished based on their average foliage or gaps in foliage. In some embodiments, the LiDAR module 304 can distinguish between physical structures based on representations of the physical structures as geometric shapes in one or more point clouds. For example, a pair of adjacent physical structures having different geometric shapes can be distinguished. In some embodiments, the LiDAR module 304 can distinguish between physical structures based on doors (or entrances) detected in representations of the physical structures in one or more point clouds. For example, different physical structures may have different door types or symmetry (e.g., single doors, dual doors, revolving doors, etc.). In another example, different physical structures may have different door sizes. In yet another example, different physical structures may have doors that are aligned differently along a path. In some embodiments, when distinguishing physical structures based on doors, the LiDAR module 304 can bias door detection at corners and midpoints of the physical structures. In some embodiments, the LiDAR module 304 can distinguish between physical structures based on windows detected in representations of the physical structures in one or more point clouds. For example, different physical structures may have different window types or sizes. In another example, different physical structures may have different window spacing. In some embodiments, the LiDAR module 304 can be implemented as one or more machine learning models that can be trained and refined over time as additional LiDAR data is collected and analyzed.

The image processing module 306 can be configured to disambiguate physical structures based on digital images in which the physical structures are represented. For example, in some embodiments, the image processing module 306 can apply generally known image segmentation techniques to partition an image into discrete segments. Each discrete segment can include pixels that share one or more characteristics such as color, intensity, or texture. These discrete segments can be used to visualize meaningful boundaries between physical structures and other objects represented in images. In some embodiments, such boundaries can be used to distinguish between physical structures and other objects represented in image data. In some embodiments, the image processing module 306 can be used in conjunction with the LiDAR module 304 to disambiguate physical structures. For example, segmentation data produced by the image processing module 306 can be overlaid with one or more point clouds determined by the LiDAR module 304 to disambiguate physical structures, for example, by biasing on doors (or entrances) over windows. In some embodiments, the image processing module 306 can be implemented as one or more machine learning models that can be trained and refined over time as additional image data is collected and analyzed. In some embodiments, the image processing module 306 can be configured to disambiguate physical structures based on color temperature consistency. For example, physical structures may have different types of lighting (e.g., brightness, color, etc.) that can be used to distinguish between the physical structures. In some embodiments, a first physical structure can be distinguished from a second physical structure based on an inconsistency or threshold level of difference between an average color temperature of lighting corresponding to the first physical structure and an average color temperature of lighting corresponding to the second physical structure. In some embodiments, the image processing module 306 can be configured to disambiguate physical structures based on threshold changes to a camera auto white balance (AWB) setting when capturing images of the physical structures.

The OCR module 308 be configured to disambiguate physical structures on a road based on optical character recognition (OCR) data determined from images captured while driving the road. For example, the OCR module 308 can apply generally known OCR techniques to convert text represented in image data to machine-readable text. In some embodiments, physical structures can be distinguished based on their detected building numbers (or street numbers). For example, the OCR module 308 can apply generally known OCR techniques to identify building numbers associated with physical structures. In this example, physical structures with different building numbers can be distinguished from one another. In another example, physical structures can be distinguished based on suite numbers. In some embodiments, the OCR module 308 can distinguish between physical structures based on typography (e.g., a style; arrangement; appearance of letters, numbers, and symbols) of text recognized on or in association with those physical structures. For example, physical structures that correspond to different businesses may use different typography in signage. In some embodiments, the OCR module 308 can determine doors (or entrances) corresponding to physical structures. For example, the OCR module 308 can determine the presence of a door upon recognizing a street number located above a window. In another example, the OCR module 308 can determine the presence of a door upon recognizing text that typically appears at building entrances such as text indicating forms of payment accepted and hours of operation. In some embodiments, the OCR module 308 can be implemented as one or more machine learning models that can be trained and refined over time as additional image data is collected and analyzed.

The object module 310 can be configured to identify or confirm the presence of doors for entering and exiting physical structures. In some embodiments, the object module 310 can apply generally known motion estimation techniques to determine motion vectors for objects (e.g., pedestrians, bicycles, etc.) represented in images of physical structures. In such embodiments, the object module 310 can determine one or more common, or aggregated, motion vectors based on the represented objects. These motion vectors can be used to identify or confirm the presence of one or more doors that can be used to access a given physical structure. For example, motion vectors corresponding to pedestrians, when aggregated, may identify a door to a building that is being used to enter and exit the building. In some embodiments, the object module 310 can be implemented as one or more machine learning models that can be trained and refined over time as additional image data is collected and analyzed.

The historical map data module 312 can be configured to confirm or improve information about disambiguated physical structures. For example, in some embodiments, the historical map data module 312 can perform a comparison of disambiguated physical structures and their corresponding features (e.g., doors, windows, parking spots near entrances, marked loading and unloading zones, parking restrictions, etc.) with existing sources of data (e.g., historical map data, third-party data). For example, historical map data may provide additional information (e.g., known doorways, known interaction points, etc.) that can be used to improve or supplement information describing a disambiguated physical structure. In some embodiments, the historical map data module 312 can be implemented as one or more machine learning models that can be trained and refined over time as additional data is collected and analyzed.

In various embodiments, the LiDAR module 304, the image processing module 306, the OCR module 308, the object module 310, and the historical map data module 312 can be used in parallel to disambiguate physical structures and determine corresponding features (e.g., doors, windows, parking spots near entrances, marked loading and unloading zones, parking restrictions, etc.). For example, in some embodiments, the LiDAR module 304, the image processing module 306, the OCR module 308, the object module 310, and the historical map data module 312 can be implemented as individual machine learning models trained to predict physical structures and corresponding features. In such embodiments, the supervisor module 314 can serve as a machine learning monitor that evaluates predictions made by the individual machine learning models. For example, each of the machine learning models can individually process sensor data corresponding to a given location. In this example, the supervisor module 314 can evaluate predictions made by each of the machine learning models to disambiguate physical structures at the location and determine their corresponding features. In some embodiments, the supervisor module 314 evaluates predictions from the machine learning models using a consensus model (e.g., a distributed consensus model, a blockchain, etc.). In some embodiments, the supervisor module 314 upweights models when those models accurately predict disambiguation information or features corresponding to disambiguated physical structures.

Figure 4:
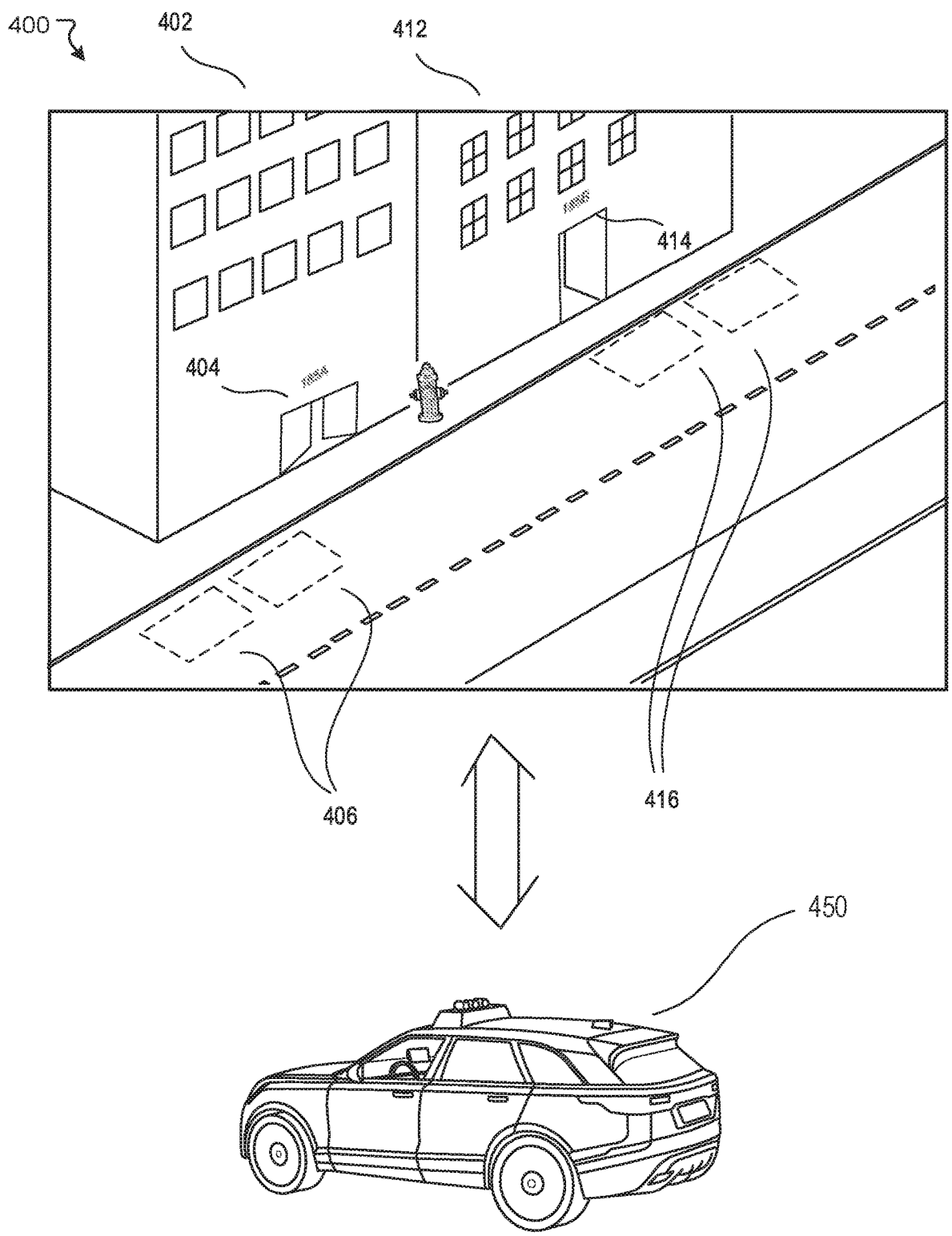
FIG. 4 illustrates an example three-dimensional interaction point map, according to an embodiment of the present technology.

FIG. 4 illustrates an example three-dimensional interaction point map 400 based on functionality of the location interaction point module 202, according to an embodiment of the present technology. The map 400 provides for a vehicle 450 detailed semantic information for various locations including, for example, physical structures present at those locations and their corresponding features. For example, in FIG. 4, the map 400 identifies a first building 402 and a doorway 404 for entering and exiting the first building 402. The map 400 also identifies a second building 412 and a doorway 414 for entering and exiting the second building 412. The map 400 can also identify the first building 402 and the second building 412 as separate physical structures even through the buildings are housed in a single physical structure. In some embodiments, the map 400 can identify interaction points that can be used to stop or park a vehicle to provide passengers with convenient access to a given physical structure. For example, the map 400 identifies a set of interaction points 406 that were determined for the first building 402 and a set of interaction points 416 that were determined for the second building 412. In various embodiments, the map 400 can be generated and updated based on sensor data collected and processed by vehicles, as described above. Accordingly, the map 400 does not reflect one or more disqualified or removed interaction points because, for example, the interaction points are being or will be partially or fully obstructed by one or more detected objects (e.g., pedestrians, vehicles, debris, etc.). Such obstruction can be determined based on the position of static objects or predicted trajectories of objects in motion. In some embodiments, the map 400 can be distributed among a fleet of vehicles that offer ridesharing services. For example, the map 400 can be distributed for purposes of improving loading and unloading of passengers at the first building 402 or the second building 412. In some embodiments, updates to the map 400 can be distributed to the fleet of vehicles at each update or at predetermined intervals.

Figure 5:
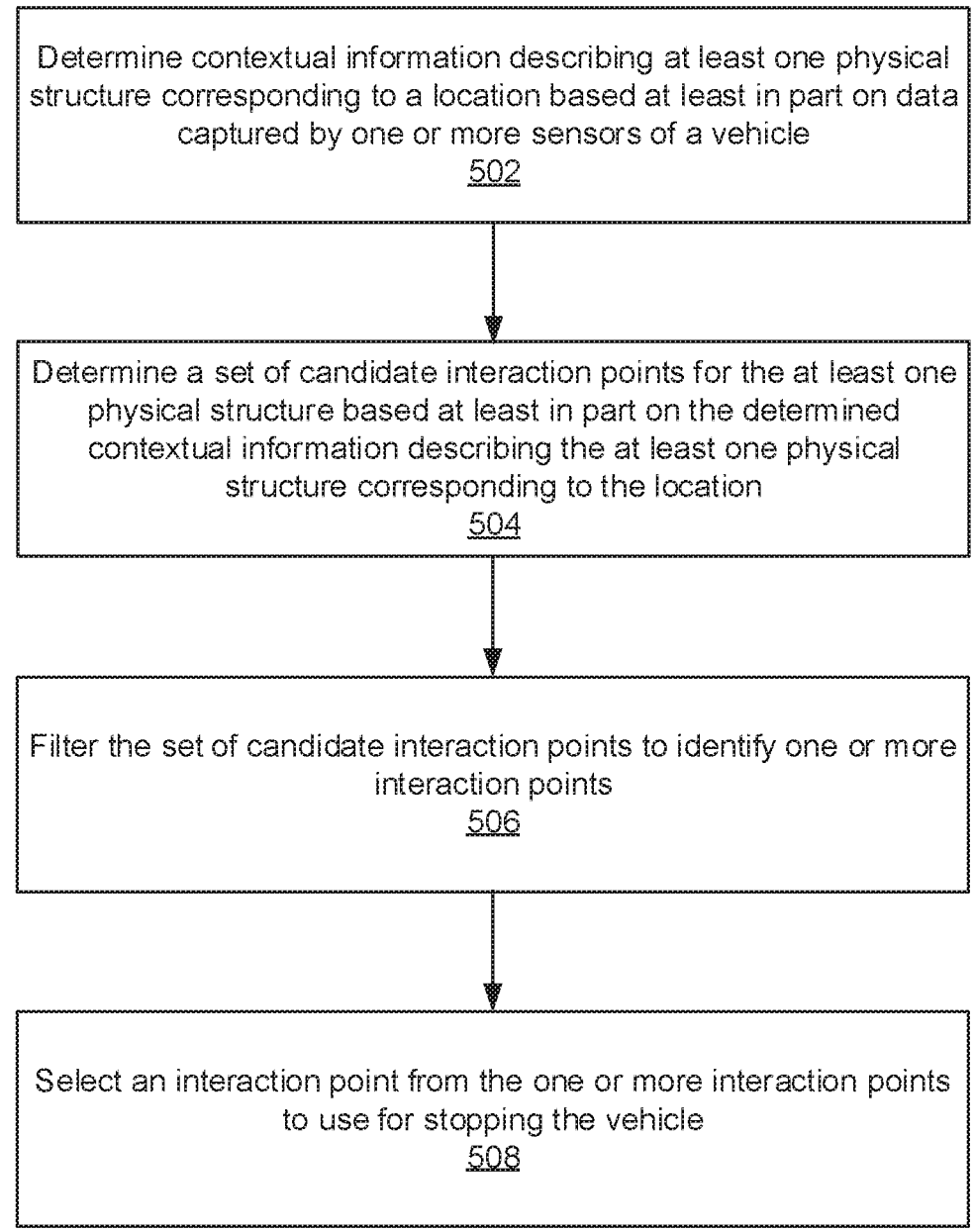
FIG. 5 illustrates an example method, according to an embodiment of the present technology.

FIG. 5 illustrates an example method 500, according to an embodiment of the present technology. At block 502, determine contextual information describing at least one physical structure corresponding to a location based at least in part on data captured by one or more sensors of a vehicle. At block 504, a set of candidate interaction points for the at least one physical structure can be determined based at least in part on the determined contextual information describing the at least one physical structure corresponding to the location. At block 506, the set of candidate interaction points can be filtered to identify one or more interaction points. At block 508, an interaction point can be selected from the one or more interaction points to use for stopping the vehicle.

Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the location interaction point module 202 may be implemented by one or more computing systems of the transportation management system 660. In some embodiments, some or all modules of the location interaction point module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, California, the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
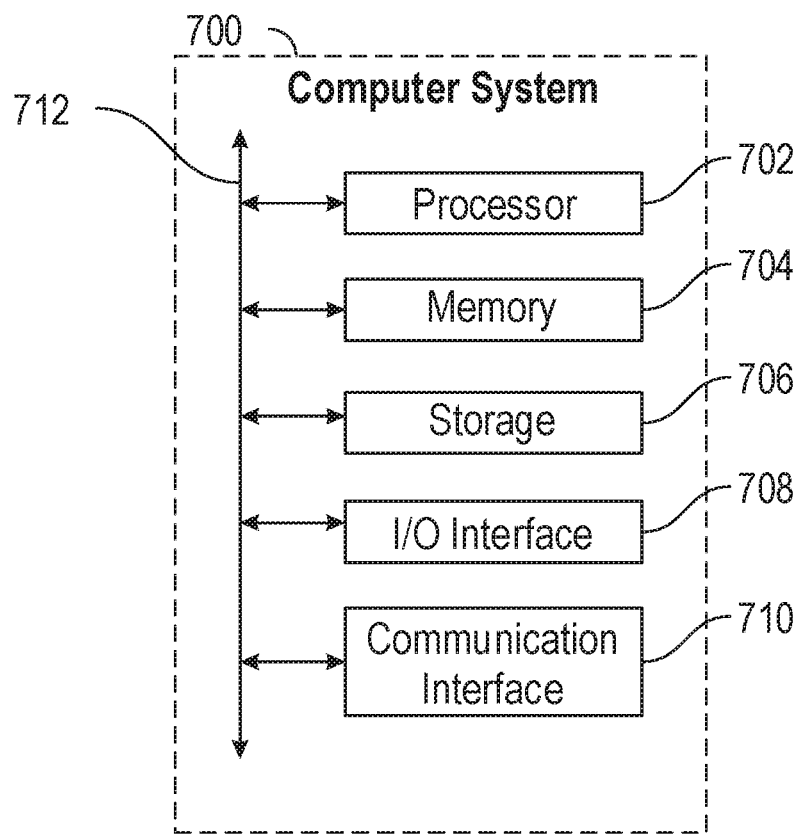
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   accessing, by a computing system, sensor data of a geographic location collected by at least one first vehicle in a fleet of vehicles while navigating the geographic location;
   accessing, by the computing system, an interaction points map associated with the geographic location, wherein the interaction points map identifies a set of interaction points associated with a building in the geographic location;
   determining, by the computing system, an update to the interaction points map associated with the geographic location based at least in part on the sensor data collected by the at least one first vehicle in the fleet of vehicles, wherein determining the update to the interaction points map further comprises:
   disambiguating, by the computing system, the building from a plurality of buildings that make up a physical structure in the geographic location based at least in part on the sensor data;
   determining, by the computing system, at least one interaction point based at least in part on motion vectors of objects in the geographic location determined based at least in part on the sensor data, wherein determining the at least one interaction point comprises:
- identifying, by the computing system, pedestrians among the objects in the geographic location; and
- determining, by the computing system, a door to the building based at least in part on an aggregation of the motion vectors of the pedestrians, wherein the at least one interaction point includes the door; and determining, by the computing system, whether to add the at least one interaction point to the interaction points map or remove the at least one interaction point from the set of interaction points for the building based at least in part on a comparison of the interaction points map and the sensor data collected by the at least one first vehicle;

prioritizing, by the computing system, the set of interaction points for the physical structure based at least in part on the sensor data of the geographic location, wherein interaction points in the set of interaction points that are within a first threshold distance of the physical structure are prioritized over additional interaction points in the set of interaction points that are outside the first threshold distance; and distributing, by the computing system, the update to the interaction points map associated with the geographic location to one or more vehicles in the fleet of vehicles, wherein the update to the interaction points map reflects the prioritization of the set of interaction points for the building over the additional interaction points.

2. The computer-implemented method of claim 1, wherein the update to the interaction points map is included in a three-dimensional semantic map that identifies interaction points associated with the geographic location.

3. The computer-implemented method of claim 1, wherein determining the update to the interaction points map associated with the geographic location further comprises:
- determining, by the computing system, the at least one interaction point in the geographic location based at least in part on the data captured by the sensors of the one or more vehicles in the fleet of vehicles;
- comparing, by the computing system, the at least one interaction point determined based at least in part on the data captured by the sensors of the one or more vehicles in the fleet of vehicles to the interaction points map associated with the geographic location;
- determining, by the computing system, the at least one interaction point is not included in the interaction points map associated with the geographic location; and
- adding, by the computing system, the at least one interaction point to the set of interaction points associated with the physical structure.

4. The computer-implemented method of claim 1, further comprising:
- determining, by the computing system, one or more features of the physical structure based at least in part on the sensor data;
- comparing, by the computing system, the one or more features of the physical structure with historical map data; and
- confirming, by the computing system, the features of the physical structure based on the comparing.

5. The computer-implemented method of claim 1, wherein a vehicle in the fleet of vehicles uses at least one interaction point of the set of interaction points as a pick-up location or a drop-off location associated with the physical structure.

6. The computer-implemented method of claim 1, wherein disambiguating the physical structure from the plurality of physical structures comprises:
- determining, by the computing system, at least one of: light reflectivity values, geometric shapes in point clouds, or color temperature consistency associated with the plurality of physical structures based at least in part on the sensor data.

7. The computer-implemented method of claim 1, further comprising:
- removing, by the computing system, the at least one interaction point from the interaction points map associated with the geographic location based at least in part on a determination the at least one interaction point is disqualified; or
- causing, by the computing system, at least one different interaction point from the interaction points map associated with the geographic location to be prioritized over the at least one interaction point when stopping a vehicle based at least in part on the at least one interaction point being disqualified.

8. The computer-implemented method of claim 1, wherein
disambiguating the building from the plurality of buildings that make up the physical structure in the geographic location comprises:
- partitioning, by the computing system, image data of the sensor data into segments that share one or more characteristics; and
- determining, by the computing system, boundaries of the plurality of buildings based on the segments.

9. The computer-implemented method of claim 1, wherein disambiguating the building from the plurality of buildings that make up the physical structure in the geographic location comprises:
- overlaying, by the computing system, segmentation data produced based at least in part on image data of the sensor data over one or more point clouds produced based at least in part on LiDAR data of the sensor data; and
- biasing, by the computing system, the segmentation data over the one or more point clouds to prioritize a feature of the building.

10. The computer-implemented method of claim 1, further comprising:
- determining, by the computing system, the at least one interaction point is within a threshold distance of one or more objects, the at least one interaction point is partially or fully obstructed by one or more objects based at least in part on the data captured by the one or more sensors of the one or more vehicles, or parking restrictions associated with the geographic location based at least in part on the data captured by the one or more sensors of the one or more vehicles in the fleet of vehicles;
- determining, by the computing system, the at least one interaction point is unusable for stopping a vehicle based at least in part on the at least one interaction point being within the threshold distance of the one or more objects, the at least one interaction point being partially or fully obstructed, or the parking restrictions associated with the geographic location; and removing, by the computing system, the at least one interaction point based at least in part on the determining the at least one interaction point is unusable.

11. A system comprising:
at least one processor; and
a memory storing instructions that, when executed by the at least one processor, cause the system to perform:
  accessing sensor data of a geographic location collected by at least one first vehicle in a fleet of vehicles while navigating the geographic location;
  accessing an interaction points map associated with the geographic location, wherein the interaction points map identifies a set of interaction points associated with a building in the geographic location;
  determining an update to the interaction points map associated with the geographic location based at least in part on the sensor data collected by the at least one first vehicle in the fleet of vehicles, wherein determining the update to the interaction points map further comprises:
    disambiguating the building from a plurality of buildings that make up a physical structure in the geographic location based at least in part on the sensor data;
    determining at least one interaction point based at least in part on motion vectors of objects in the geographic location determined based at least in part on the sensor data, wherein determining the at least one interaction point comprises:
      identifying pedestrians among the objects in the geographic location; and
      determining a door to the building based at least in part on an aggregation of the motion vectors of the pedestrians, wherein the at least one interaction point includes the door; and
    determining whether to add the at least one interaction point to the interaction points map or remove the at least one interaction point from the set of interaction points for the building based at least in part on a comparison of the interaction points map and the sensor data collected by the at least one first vehicle;
  prioritizing the set of interaction points for the physical structure based at least in part on the sensor data of the geographic location, wherein interaction points in the set of interaction points that are within a first threshold distance of the physical structure are prioritized over additional interaction points in the set of interaction points that are outside the first threshold distance; and
  distributing the update to the interaction points map associated with the geographic location to one or more vehicles in the fleet of vehicles, wherein the update to the interaction points map reflects the prioritization of the set of interaction points for the building over the additional interaction points.

12. The system of claim 11, wherein the update to the interaction points map is included in a three-dimensional semantic map that identifies interaction points associated with the geographic location.

13. The system of claim 11, wherein determining the update to the interaction points map associated with the geographic location further causes the system to perform:
  determining the at least one interaction point in the geographic location based at least in part on the data captured by the sensors of the one or more vehicles in the fleet of vehicles;
  comparing the at least one interaction point determined based at least in part on the data captured by the sensors of the one or more vehicles in the fleet of vehicles to the interaction points map associated with the geographic location;
  determining the at least one interaction point is not included in the interaction points map associated with the geographic location; and
  adding the at least one interaction point to the set of interaction points associated with the physical structure.

14. The system of claim 11, further comprising:
  determining one or more features of the physical structure based at least in part on the sensor data;
  comparing the one or more features of the physical structure with historical map data; and
  confirming the features of the physical structure based on the comparing.

15. The system of claim 11, wherein a vehicle in the fleet of vehicles uses at least one interaction point of the set of interaction points as a pick-up location or a drop-off location associated with the physical structure.

16. A non-transitory computer-readable storage medium including instructions that, when executed by at least one processor of a computing system, cause the computing system to perform:
  accessing sensor data of a geographic location collected by at least one first vehicle in a fleet of vehicles while navigating the geographic location;
  accessing an interaction points map associated with the geographic location, wherein the interaction points map identifies a set of interaction points associated with a building in the geographic location;
  determining an update to the interaction points map associated with the geographic location based at least in part on the sensor data collected by the at least one first vehicle in the fleet of vehicles, wherein determining the update to the interaction points map further comprises:
    disambiguating the building from a plurality of buildings that make up a physical structure in the geographic location based at least in part on the sensor data;
    determining at least one interaction point based at least in part on motion vectors of objects in the geographic location determined based at least in part on the sensor data, wherein determining the at least one interaction point comprises:
      identifying pedestrians among the objects in the geographic location; and
      determining a door to the building based at least in part on an aggregation of the motion vectors of the pedestrians, wherein the at least one interaction point includes the door; and
    determining whether to add the at least one interaction point to the interaction points map or remove the at least one interaction point from the set of interaction points for the building based at least in part on a comparison of the interaction points map and the sensor data collected by the at least one first vehicle;
  prioritizing the set of interaction points for the physical structure based at least in part on the sensor data of the geographic location, wherein interaction points in the set of interaction points that are within a first threshold distance of the physical structure are prioritized over additional interaction points in the set of interaction points that are outside the first threshold distance; and distributing the update to the interaction points map associated with the geographic location to one or more vehicles in the fleet of vehicles, wherein the update to the interaction points map reflects the prioritization of the set of interaction points for the physical structure over the additional interaction points.

17. The non-transitory computer-readable storage medium of claim 16, wherein the update to the interaction points map is included in a three-dimensional semantic map that identifies interaction points associated with the geographic location.

18. The non-transitory computer-readable storage medium of claim 16, wherein determining the update to the interaction points map associated with the geographic location further causes the system to perform:

determining the at least one interaction point in the geographic location based at least in part on the data captured by the sensors of the one or more vehicles in the fleet of vehicles;

comparing the at least one interaction point determined based at least in part on the data captured by the sensors of the one or more vehicles in the fleet of vehicles to the interaction points map associated with the geographic location;

determining the at least one interaction point is not included in the interaction points map associated with the geographic location; and adding the at least one interaction point to the set of interaction points associated with the physical structure.

19. The non-transitory computer-readable storage medium of claim 16, further comprising:

determining one or more features of the physical structure based at least in part on the sensor data;

comparing the one or more features of the physical structure with historical map data; and confirming the features of the physical structure based on the comparing.

20. The non-transitory computer-readable storage medium of claim 16, wherein a vehicle in the fleet of vehicles uses at least one interaction point of the set of interaction points as a pick-up location or a drop-off location associated with the physical structure.

* * * * *